United States Patent
Van Saarloos et al.

(10) Patent No.: US 6,381,255 B1
(45) Date of Patent: Apr. 30, 2002

(54) SOLID STATE UV LASER

(75) Inventors: Paul Phillip Van Saarloos, Karrinyup (AU); Wayne Sheldon Pelouch, Erie, CO (US)

(73) Assignee: The Lions Eye Institute of Western Australia Incorporated (AU)

( * ) Notice: Subject to any disclaimer, the term of this patent is extended or adjusted under 35 U.S.C. 154(b) by 0 days.

(21) Appl. No.: 09/484,777

(22) Filed: Jan. 18, 2000

(30) Foreign Application Priority Data

Jul. 16, 1997 (AU) .............................................. PO7968
Jan. 20, 1999 (AU) .............................................. PP8218

(51) Int. Cl.[7] ................................................ H01S 3/10
(52) U.S. Cl. .............................. 372/9; 372/21; 372/22; 372/34
(58) Field of Search .............................. 372/21, 22, 9, 372/84, 5; 174/255; 606/2, 12

(56) References Cited

U.S. PATENT DOCUMENTS

| 4,346,314 A | 8/1982 | Crixton ....................... 307/427 |
| 5,144,639 A | 9/1992 | Lin .............................. 372/22 |
| 5,592,325 A | 1/1997 | Dodge et al. ................. 359/326 |
| 6,210,401 B1 * | 4/2000 | Lai .............................. 606/12 |
| 6,156,030 A * | 12/2000 | Neev ............................... 606/2 |
| 6,313,411 B1 * | 11/2001 | Budnaitis ..................... 174/255 |

OTHER PUBLICATIONS

Mori et al. 1995 New nonlinear optical crystal: Cesium Lithium Borate, Applied Physics Letters 67(13):1818–1820).
Yap et al., 1996 "High–power fourth– and fifth–harmonic generation, of a Nd:YAG laser by means of a CsLiB6010." Optic Letters 31(17): 1348–1350).
Lago et al., (1988, Coherent 70.9–nm radiation generated in Neon by frequency tripling the fifth harmonic of an Nd:YAG laser. Optic Letters 13(3): 221–223).

* cited by examiner

Primary Examiner—Leon Scott, Jr.
(74) Attorney, Agent, or Firm—Baker Botts LLP (57) ABSTRACT

A method and apparatus is provided for generating a laser beam of a wavelength suitable for ablating material. The apparatus includes a source of a laser beam of a wavelength which is not suitable for ablation and a frequency converter which uses harmonic generation to generate a laser beam of a suitable frequency. In preferred arrangements the frequency converter is a non-linear optical material that is maintained at a predetermined elevated temperature. In a preferred arrangement the pulse rate of the laser is selected to maintain the acceptance angle of the harmonic generator within predetermined limits.

70 Claims, 5 Drawing Sheets

SOLID STATE UV LASER

RELATED APPLICATION

This is a continuation-in-part of copending International application No. PCT/AU98/0053 filed and Provisional application No. PP8218 filed Jan. 20, 1999.

This application is a continuation-in-part of international patent application PCT/AU98/00554, which designated the United States of America.

FIELD OF THE INVENTION

The present invention relates to the laser processing or ablation of materials, and is suitable, for example, for surgical and medical applications, including operations for correcting refractive errors of the eye, such as photorefractive keratectomy (PRK) and laser in-situ keratomileusis (LASIK). Other examples include medical processes on a wide variety of biological tissue such as retinal tissue, bone or teeth.

BACKGROUND ART

Excimer gas lasers have an operating wavelength of 193 nm in the ultraviolet (UV) region of the electromagnetic spectrum. These lasers process material through photo-ablation, vaporising the material while causing little thermal damage to adjacent areas. This property and the availability of these lasers has led to their widespread use in the medical field. However, an all solid state UV laser has been sought as an alternative, owing to a number of inherent disadvantages associated with the excimer laser. These disadvantages include large size and high operating and maintenance costs. Excimer lasers also require the use of an extremely toxic gas.

Solid state lasers offer a smaller, more efficient, less dangerous alternative to excimer gas lasers. These lasers utilize rare-earth elements contained in glass or crystal matrices such as yttrium aluminum garnet (YAG), or yttrium lithium fluoride (YLF). Excitation of the laser medium results in stimulated atoms of elements such as neodymium, erbium and holmium producing high energy laser emissions. A variety of wavelengths may be produced depending on the rare earth element that the laser contains. Some of the more common solid state lasers are Nd:YLF at 1.053 microns, Ho:YAG at 2.1 microns and Er:YAG at 2.94 microns. A Neodymium:YAG laser produces a wavelength of 1064 nm (1.06 microns), which is in the infra-red portion of the electromagnetic spectrum.

Solid state lasers produce beams of longer wavelengths than the excimer laser and have been successfully applied to different medical and industrial processes. However, the longer infra-red wavelengths may also produce undesirable effects when applied to certain materials, such as corneal tissue. As such, a demand exists for a solid state laser source that emits a wavelength in the ultraviolet region.

With the development of new non-linear optical (NLO) crystals, an all solid state UV laser source has been realized. The use of non-linear optical crystals for frequency conversion of high intensity laser emissions is well known to those with an understanding of the art (see, for example U.S. Pat. No. 5,144,630). When an infra-red laser beam is directed through a NLO crystal, its wavelength can be altered. This property allows conversion of an infra-red laser, such as the Nd:YAG at 1064 nm, to a shorter wavelength of 532 nm, a process known as harmonic generation (see, for example, U.S. Pat. No. 5,592,325 and U.S. Pat. No. 4,346,314). Generation of the fourth and fifth harmonic wavelengths of a Nd:YAG laser, at 266 nm and 213 nm respectively, extends the sphere of the solid state laser, making it suitable for a wider range of applications.

Prior art techniques for harmonic generation have often involved the use of non-linear optical crystals of the borate family. Crystals such as beta barium borate ($\beta$-$BaB_2O_4$ or BBO), lithium borate (LBO), $MBeBO_3F_2$ and $CsB_3O_5$ have been used previously as frequency conversion compounds (Mori et al 1995 "New nonlinear optical crystal: Cesium Lithium Borate. *Applied Physics Letters* 67(13): 1818–1820). Other popular NLO crystals for harmonic generation include Potassium Titanyl Phosphate, (KTP or $KTiOPO_4$) (see, for example, U.S. Pat. No. 5,144,630 and U.S. Pat. No. 5,592,325). However, these crystals exhibit poor energy conversions for fourth and fifth harmonic generation.

More recently with the invention of the NLO crystal, caesium lithium borate ($CsLiB_6O_{10}$ or CLBO), improved performance has been observed in generating the fourth and fifth harmonics of the Nd:YAG laser (Yap et al. 1996 "High-power fourth- and fifth-harmonic generation of a Nd:YAG laser by means of a CsLiB6O10." *Optics Letters* 21(17): 1348–1350). Lago et al, (1988, "Coherent 70.9-nm radiation generated in Neon by frequency tripling the fifth harmonic of an Nd:YAG laser. *Optics Letters* 13(3): 221–223) were able to generate 20 mJ in a 5 ns pulse at the fifth harmonic, using three BBO crystals for fifth harmonic generation of a Nd:YAG laser at 213 nm. This corresponds to an overall conversion efficiency of 2.4% in terms of input energy at 1064 nm. In comparison, Yap et al, as reported in the aforementioned paper, were able to achieve an overall conversion efficiency of 10.4% using CLBO crystals.

The advantages of using the CLBO crystal over BBO crystals can also be seen by comparison of the non-linear properties of the crystals. When generating harmonic wavelengths in the UV spectrum, CLBO, despite having a smaller non-linear coefficient, has a larger angular bandwidth, spectral bandwidth and temperature acceptance. Also, unlike BBO, CLBO does not suffer from any problems with absorption and/or photorefraction. These features make the crystal useful for medical applications, as it makes the alignment of the laser beam less critical and more stable. In addition, the walkoff angle for CLBO is up to three times smaller than for BBO. CLBO therefore offers an attractive advance over the prior art for fourth and fifth harmonic generation of a reliable solid state laser.

The practical difficulty, however, is to achieve a consistent and reliable laser energy output in the course of a surgical procedure, and from procedure to procedure: CLBO crystals are not inherently robust and stable. It is an object of the present invention to at least in part overcome this difficulty.

SUMMARY OF THE INVENTION

The conventional view in utilizing non-linear optical materials for frequency conversion is that their relatively low conversion efficiencies and limited damage thresholds were best countered by pulsing the input laser energy at relatively high frequencies, eg. in the order of the kHz. Furthermore, to guard against overheating of the crystals, resulting in crystal damage, pulse energies were customarily kept low.

The present inventors have appreciated, in one or more embodiment of the invention, that an enhanced outcome can be achieved by maintaining the non-linear optical material at an elevated temperature to stabilise the material, and by addressing the conversion efficiency issue by instead pulsing the source laser beam at a higher pulse energy but lower frequency, selecting the frequency so that the acceptance angle of the non-linear crystals remains, or returns to be, substantially within predetermined limits for successive pulses of the source beam. The laser beam diameter can be expanded or not reduced so much that the energy density of all laser beams are below the damage thresholds of the crystals.

It is thought that, at the lowered frequency, there is a greater interval between pulses sufficient to allow thermal relaxation for the acceptance angle, even if deviated outside the aforesaid limits, to return to within an acceptable range. By this is meant that the axis or orientation of the acceptance angle returns to within the acceptable range. A satisfactory frequency range is below 100 Hz, preferably between 5 and 50 Hz, more preferably between 5 and 30 Hz, most preferably between 10 and 30 Hz.

In one aspect, the invention provides an apparatus for generating a laser beam of wavelength suitable for ablating material, including:

a source of an initial pulsed laser beam of wavelength unsuitable for said ablation; and frequency conversion means to derive from the initial laser beam by harmonic generation a laser beam of a wavelength suitable for ablating material;

wherein said initial laser beam is pulsed at a pulse rate between 5 and 30 Hz.

The invention further provides, in another aspect, an apparatus for generating a laser beam of wavelength suitable for ablating material, including:

a source of an initial pulsed laser beam of wavelength unsuitable for said ablation; and frequency conversion means to derive from the initial laser beam by harmonic generation a laser beam of a wavelength suitable for ablating material;

wherein said frequency conversion means includes a non-linear optical material and means is provided to maintain said material at a temperature of at least 40° C.

Corresponding methods are also provided.

The invention further provides, in a further aspect, apparatus for generating a laser beam of wavelength suitable for ablating material, including:

a source of an initial laser beam pulsed at a predetermined pulse rate and of wavelength unsuitable for said ablation; and frequency conversion means to derive from the initial laser beam a harmonic component of said wavelength suitable for ablating material;

wherein said frequency conversion means includes a non-linear optical material and means is provided to maintain said non-linear material at a predetermined elevated temperature;

and wherein said pulse rate is predetermined whereby the acceptance angle of the harmonic component remains substantially within predetermined limits for successive pulses of the initial laser beam at said elevated temperature.

In a still further aspect, the invention provides a method of generating a laser beam of wavelength suitable for ablating material, including:

providing an initial laser beam pulsed at a predetermined pulse rate and of wavelength unsuitable for said ablation;

directing the initial laser beam through frequency conversion means including a non-linear optical material that derives from the initial laser beam a harmonic component of said wavelength suitable for ablating material;

maintaining said non-linear optical material at a predetermined elevated temperature; and setting said pulse rate whereby the acceptance angle of the harmonic component remains substantially within predetermined limits for successive pulses of the initial laser beam at said elevated temperature.

In a preferred application, the method includes utilising the laser beam of suitable wavelength to ablate material. The ablated material may be human or animal tissue, including corneal tissue. When the material being ablated is corneal, the UV energy deposited on the material is preferably between 3 and 50 mJ per pulse. A particularly advantageous application is for refractive surgery of the cornea, eg. by photorefractive keratectomy (PRK) or laser in-situ keratomileusis (LASIK).

The aforementioned predetermined limits for the acceptance angle arise from a practical requirement, with applications such as medicine, for the laser to reach stable, desirable energy levels, every time the laser is switched on, without the need for re-alignment of the crystals. Normally, temperature and temperature gradient changes induced in NLO crystals by laser beams cause the acceptance angle of the crystals to shift out of alignment with the beams, usually forcing re-alignment of the crystal orientation. Re-alignment is then needed again once the laser beams have been turned off, before the harmonic components can be restarted.

A preferred angular range defining said predetermined limits is an angle equal to the acceptance angle itself.

The elevated temperature is at least 40° C. and preferably greater than 60° C. It is thought that there is no upper limit to the temperature, other than in the practical respect that above about 100° C,, little additional benefit is achieved in return for the additional heat energy input. The non-linear optical material is preferably held in a heat conductive holder to which heat is applied for maintaining the material at said predetermined elevated temperature. The non-linear optical material is preferably a crystal, and advantageously a pair of juxtaposed crystals for effecting successive frequency conversion operations as the laser beam traverses the crystals in turn. The pair of crystals are advantageously retained together in contact in said holder, means being included to bias the crystals against each other, for minimising energy losses.

The non-linear optical material advantageously includes at least one caesium lithium borate ($CsLiB_6O_{10}$ or CLBO) crystals.

For CLBO crystal, an optimum elevated temperature range is between 60° and 200° C., most preferably around 80° C.

Preferably said method includes directing said beam or a portion of said beam to a laser delivery system and then onto an area of said material to be ablated by means of said laser delivery system. The laser delivery system may include a beam delivery system, a scanning system and/or a fibre optic delivery system. Thus, the laser delivery system includes any system suitable for delivering a laser beam to a desired location.

Preferably the non-linear optical material is in a sealed dry, inert atmosphere.

Preferably said laser beam has a fundamental wavelength of between 0.5 and 2.5 micron, and more preferably approximately 1 micron.

Preferably, the source of the initial laser beam is a solid state laser source, eg. a $Nd^{3+}$ doped laser medium such as a Nd:YAG, Nd:YLF, Nd:glass or Nd:YVO4 laser source.

Preferably the apparatus includes a beam separating system for separating said laser beam of suitable wavelength from other harmonics generated by the frequency conversion means.

BRIEF DESCRIPTION OF THE DRAWINGS

Preferred embodiments of the invention will now be described, by way of example, with reference to the accompanying drawings in which.

PREFERRED EMBODIMENTS

Figure 1:
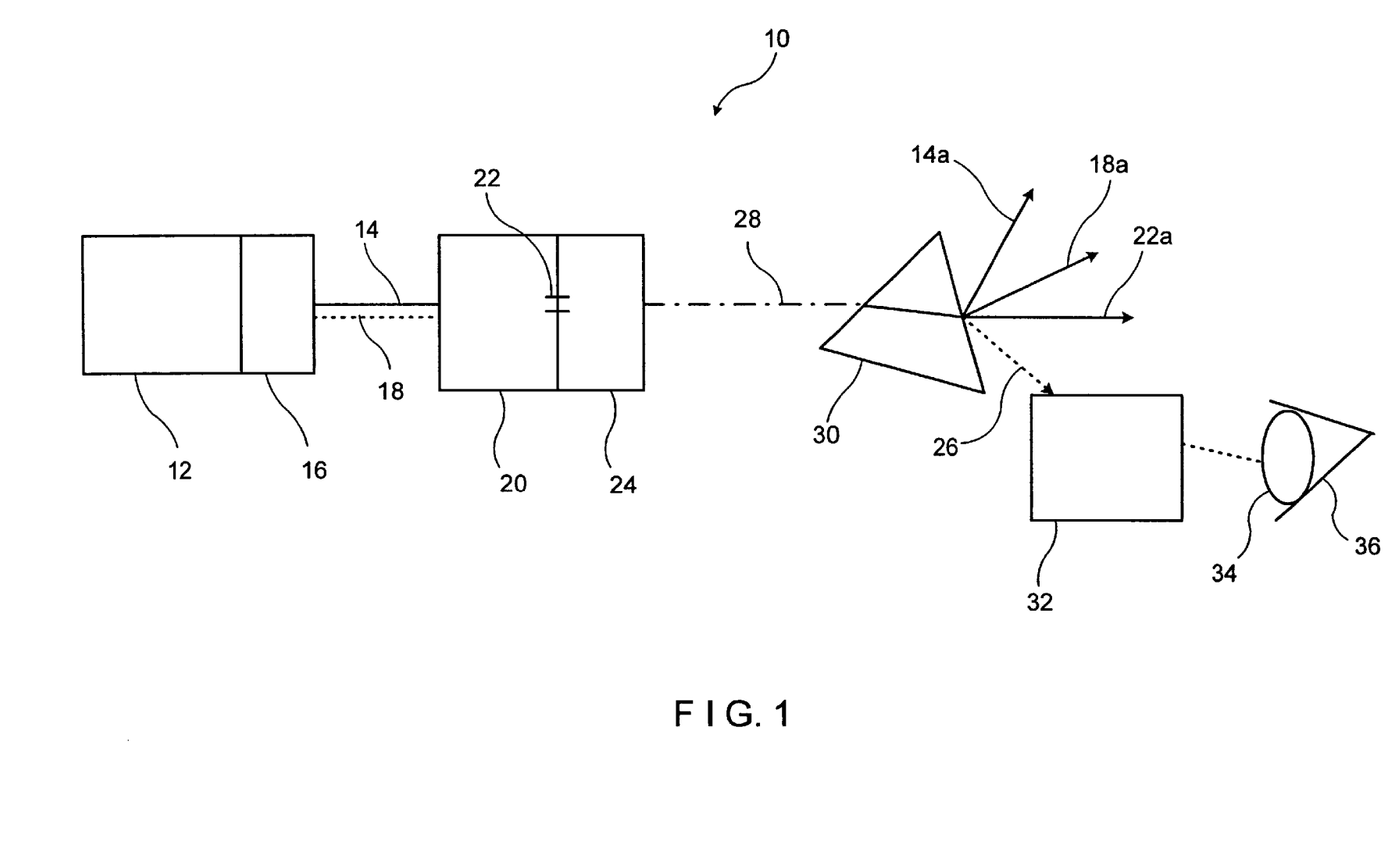
FIG. 1 is a schematic view of a laser ablation apparatus according to a first embodiment of the present invention, configured for performing laser ablation surgery on an eye.

Referring initially to FIG. 1, a laser ablation apparatus according to a preferred embodiment of the present invention is shown generally at 10. The laser ablation apparatus 10 includes a laser source in the form of a Q-switched Neodymium:YAG laser medium 12, for producing a 6–8 mm pulsed laser beam 14 of fundamental wavelength 1064 nm. The beam 14 is collimated, resulting in a collimated harmonically generated beam. Pulse energies for the fundamental wavelength range from 30 to 1000 mJ per pulse.

The laser beam 14 initially passes through a frequency doubling unit 16, which uses type I or type II phase matching and consists of a commercially available non-linear optical crystal such as BBO. Frequency doubling unit 16 generates a frequency doubled beam 18 of second harmonic wavelength 532 nm.

Frequency doubling unit 16 may alternatively use Kd*P, KTP or any other crystal suitable for second harmonic generation.

The laser beam 14 of fundamental wavelength and the frequency doubled beam 18 of second harmonic wavelength pass through a second frequency conversion compound comprising a CLBO crystal 20. In other embodiments, crystal 20 may comprise a crystal of BBO, KD*P or any other of KD*P's related isomorphs. The crystal 20 is used to convert frequency doubled beam 18 at 532 nm to a beam 22 of fourth harmonic wavelength, 266 nm. This interaction utilises type I phase matching. The beam 14 of fundamental wavelength, although passing through the crystal 20, does not contribute to any non-linear process. The beams 14, 18 and 22, of fundamental, second harmonic and fourth harmonic wavelength respectively, then pass though CLBO crystal 24, which is in surface contact with crystal 20 to minimise energy losses. In this stage the beams 14 and 22, of fundamental and fourth harmonic wavelengths respectively, are frequency mixed to produce a laser beam 26 of the fifth harmonic wavelength, 213 nm by means of sum frequency generation, a type I phase matching interaction.

The crystal lengths for the CLBO crystals 20 and 24 (for 4th and 5th harmonic generation) are approximately 5 mm and 3 mm, respectively. The apertures of the crystals 20 and 24 are large enough to transmit all beams without clipping. The beam size is chosen so that the energy density of all laser beams is below the damage threshold of each crystal.

After all the beams 14, 18 and 22 have passed through the fifth harmonic CLBO crystal 24, the fundamental and harmonic wavelengths are spatially overlapping. In order to isolate the beam 26 of fifth harmonic wavelength, 213 nm, the beams must be separated. The combined output beam 28 is therefore passed through a beam separating system in the form of dispersing prism 30, which separates the beams. In alternative embodiments any of the other known methods of beam separation may be used, such as the use of a dichroic mirror to reflect only the fifth harmonic wavelength. With the 213 nm wavelength beam 26 spatially separated from the other harmonics (beams 14a, 18a and 22a of 1064 nm, 532 nm and 266 nm respectively), the beam 26 of fifth harmonic wavelength then passes to a laser delivery system 32. The delivery system 32 comprises a scanning unit, a beam delivery system (which may comprise masks, a computer controlled iris, and beam shaping optics), and/or a fibre optic; delivery system. A beam delivery system may include a scanner. The beam 26 of wavelength 213 nm is then delivered to the material to be ablated, for example the cornea 34 of an eye 36.

Figure 2:
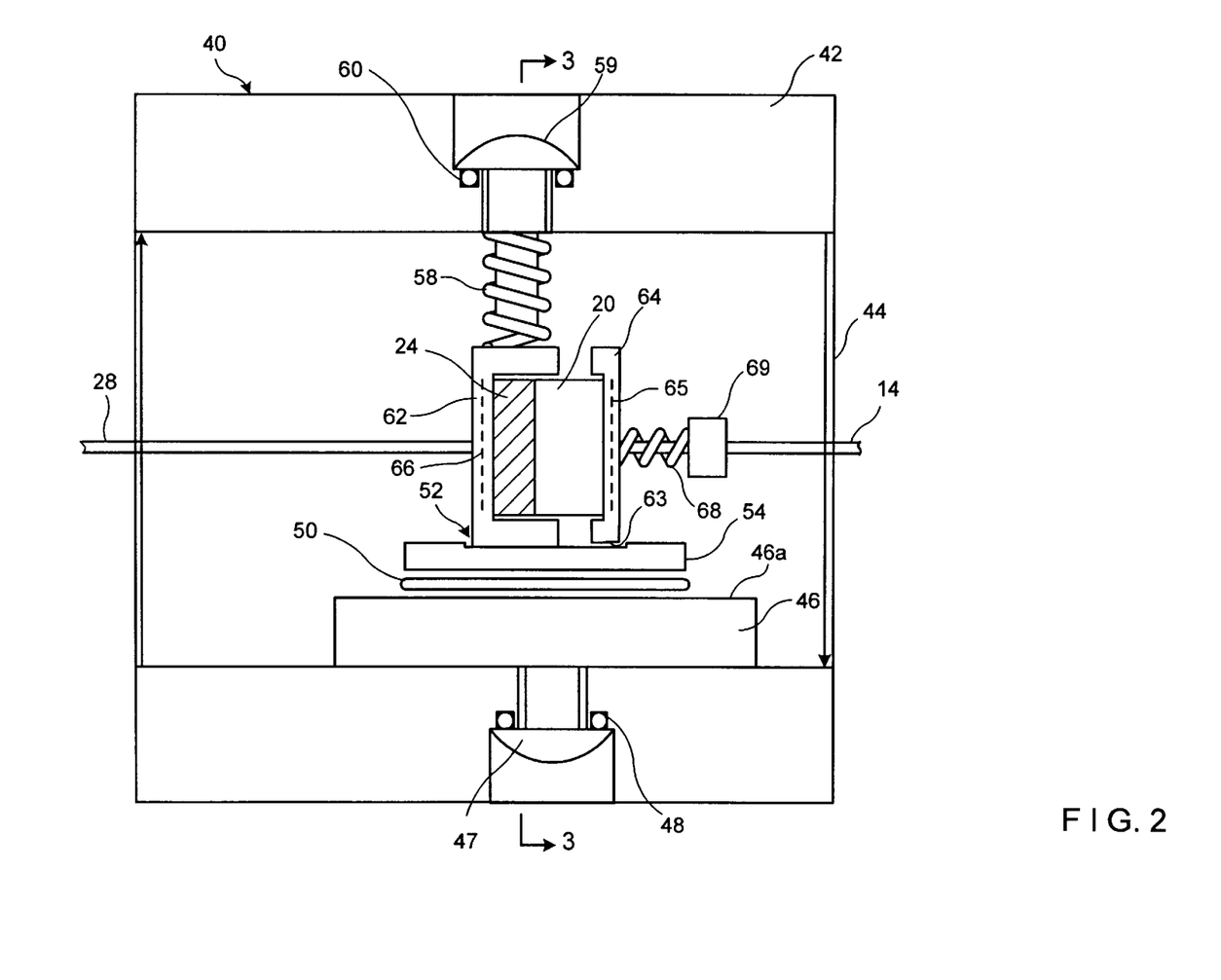
FIG. 2 is a vertical cross-sectional view of the mounting arrangement for the two CLBO crystals depicted in FIG. 1.
Figure 3:
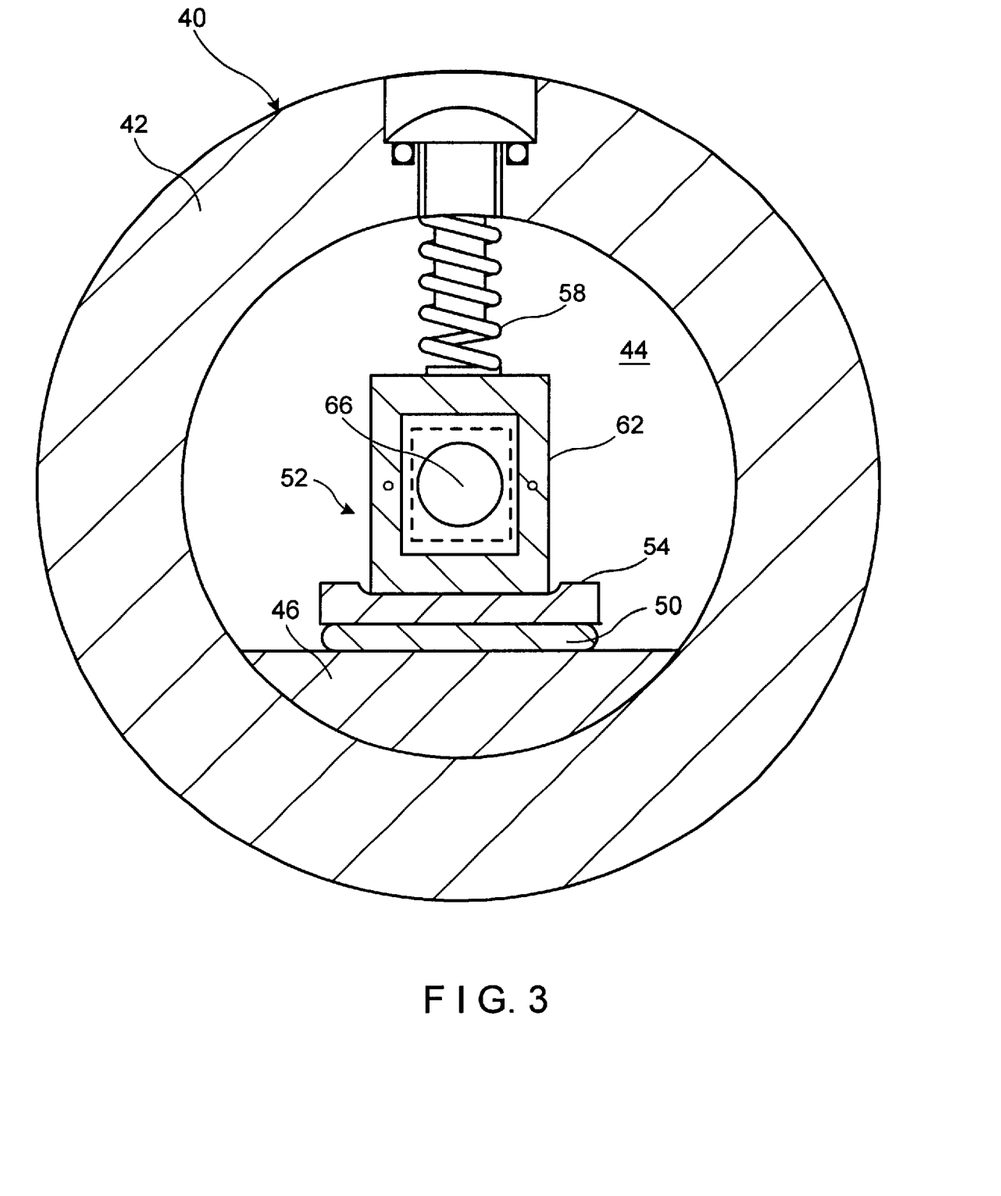
FIG. 3 is a cross-section on the line 3—3 in FIG. 2.

With reference to FIGS. 2 and 3, CLBO crystals 20, 24 are retained in a housing 40 comprising a generally cylindrical casing 42 with end windows 44, 45 transparent to the laser beams required. A base plate 46 with a flat top 46a and an arcuate bottom is fixed to casing 42 by radial bolt 47 with associating sealing O-ring 48.

A thermo-electric temperature stabilising mechanism 50 is sandwiched between base plate 46 and a thermally conductive assembly 52 consisting of a location plate 54 and holder 62 for crystals 20, 24. These components, plate 54 and holder 62, may be integral, but are here separate, good thermal contact between assembly 52 and thermoelectric element 50 being maintained by a helical compression spring 58 which is retained on a stud 59 between casing 42 and the top of surface of holder 62. Again stud 59 projects though an aperture in casing 42 sealed by O-ring 60.

Holder 62 is conveniently a vertical structure with its interior bounded at one end by an aperture 66 and open at the other to receive crystals 20, 24. Alternatively holder 62 may be a flat piece of thermally conductive material. Crystals 20, 24 are conveniently 10×10 mm, and crystal 20 projects from holder 62 but is retained by press-plate 64 with aperture 65. The crystals do not contact the "top" and "bottom" surface of holder 62, instead there is an approximately 0.5 mm allowance, such that heat flow is through the vertical surface of holder 62 only. Press-plate 64 does not contact location plate 54 (as indicated by gap 63) and is biased toward holder 62 by a pair of helical compression springs 68 that act on press plate 64 to keep crystals 20 and 24 in contact and to keep crystal 24 in thermal contact with holder 62.

The interior chamber of housing 40 is filled with argon or another inert gas. (The sealed ports for the gas and the electrical leads for temperature mechanism 50 are not shown), and the beams 14, 18 pass through crystals 20, 24 in turn, substantially along the axis of housing 40, through windows 44 and 45 and apertures 65 and 66 in turn, while using thermo-electric element 50 to impart a stable heat to crystals 20, 24 via heat conductive assembly 52. Temperature stabilising mechanism 50 is involved in active feedback of temperature control through assembly 52, holder 62 and crystal 20, 24. Mechanism 50 is capable of adjusting the temperature of the holder, through heating or cooling, so that the crystals are consistently maintained at a constant predetermined temperature. Temperature probes (not shown) facilitate control of the temperature in an elevated range, eg. 60–200° C., especially about 80° C., that assists in maintaining the operational stability of the crystals. The input beam is pulsed at a rate selected so that, as explained above, the acceptance angle of the respective crystals remain within predetermined limits for successive pulses of the initial laser beam at the maintained elevated temperature of the crystals. An alternative view of this process is that the rate is selected so that the induced temperature changes and gradients with each crystal return to be within predetermined limits for successive pulses of the initial laser beam from that which exist when the laser beam is off. A satisfactory frequency range is below 100 Hz, preferably between 5 and 50 Hz, more preferably between 5 and 30 Hz, most preferably between 10 and 30 Hz.

In a convenient approach, the predetermined limits are set equal to the acceptance angle in a defined state of the crystal (eg in the "warmed up" state), and the acceptance angle is then considered to remain within such limits while the axis of the acceptance angle, ie its orientation, remains within an angular range equal to the acceptance angle itself. The actual acceptance angle, and therefore the predetermined limits, for a particular crystal are influenced by several factors including the type and quality of the crystal, temperature, and the manufacturer of the crystal. For a CLBO crystal, the acceptance angle, and therefore the predetermined limits, may be, for example, 0.48–0.54 mrad-cm for fourth harmonic generation at 266 nm and 0.37–0.41 mrad-cm for the fifth harmonic stage. In comparison, the acceptance angle for a BBO crystal for fourth harmonic generation is typically about 0.19 mrad-cm, and for the fifth harmonic stage the acceptance angle is approximately 0.13 mrad-cm. Both values are clearly lower than for the CLBO crystal. The CLBO crystal therefore has the additional advantage that the acceptance angle is significantly greater than for BBO crystals, thus reducing sensitivity to temperature induced variations in alignment.

It will be understood that the optimal "cold" or "off" alignment of the laser will be different from that when the laser is firing. (The laser is typically aligned for the "warmed up" state). The shift is proportional to the pulse repetition rate. When the laser is not running the crystals maintain a generally average stable temperature. When the laser is switched on, the temperature distribution changes and thermal gradients appear in the crystals. If the pulse rate was too high it would produce large temperature and gradient changes in the crystal resulting in unacceptable changes in the temperature and temperature gradient of the crystals, allowing the "cold" state to be within the acceptance angle of the "warmed up" state. The relatively large acceptance angle of CLBO crystals (as noted above) further helps the "cold" (ie just switched on) and "warmed up" (been running for a while) states to both fall within the acceptance angle when the pulse rate is low.

Thus, proper choice of repetition rate ensures, on the one hand, sustained operation without temperature induced misorientation of the acceptance angle, and, on the other hand, an acceptance angle in the cold state which is functionally correctly aligned for start up.

Figure 4:
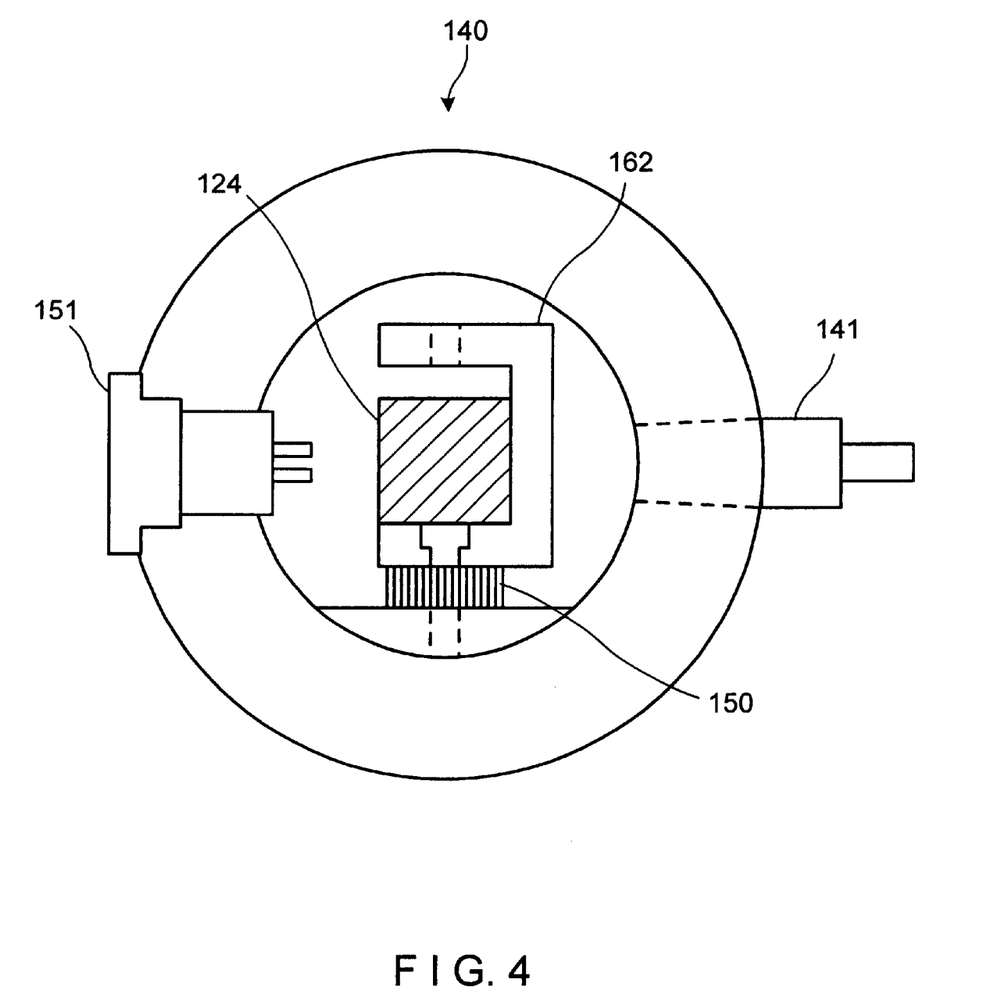
FIG. 4 is a view of a housing for a CLBO crystal in a second embodiment of the invention in which the CLBO crystals are provided in separate housings.

In an alternative embodiment, crystals 20, 24 are not housed together in contact as illustrated in FIGS. 2 and 3, but in separate housings 140 as depicted for example in FIG. 4 for crystal 24. As with the first embodiment, housing 140 is made of a thermally conductive material and is filled with a dry inert gas, such as Argon, introduced through a sealed gas valve 141. The housing 140 has transparent windows at the front 144 and back (not shown) that allow the passage of fundamental and harmonically generated laser beams. A CLBO crystal 124 is placed in a removable crystal holder 162 and seated on a thermo-electric heater 150. Current is supplied through a sealed electrical connector 151. The thermal element of the heater 150 maintains the crystal 124 at a temperature between 40° C. and 200° C., and most preferably at a temperature of approximately 80° C.

Figure 5:
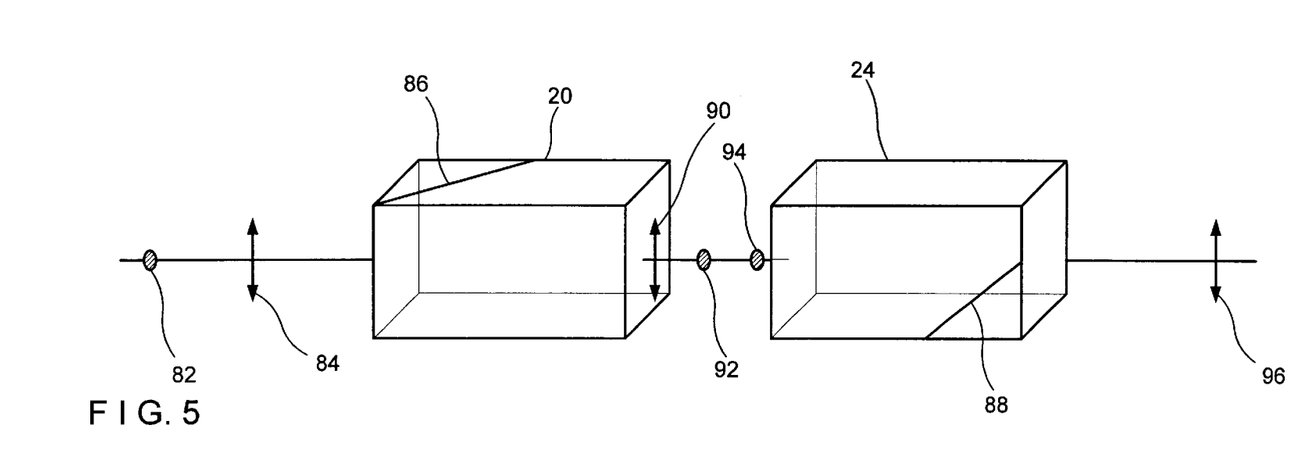
FIG. 5 is a schematic view of the relative orientation of the optic axes of the CLBO crystals in the laser ablation apparatus of FIG. 1.

Shown in FIG. 5 is the preferred relative orientation of the optic axes of the two CLBO crystals 20, 24. The axes are arranged perpendicular to each other in order to satisfy the phase matching conditions of each of the non-linear processes, as the interactions of the wavelengths depend on the polarization of the beams being mixed. Type I phase matching at the second harmonic crystal leaves, in this preferred embodiment, the 1064 nm beam horizontally polarized (indicated at 82) and the 532 nm vertically polarized beam (indicated at 84). The CLBO crystals 20 and 24 are oriented at the phase-matching angle for each harmonic generation process. For 4th and 5th harmonic generation these angles are approximately 62° C. and 67° C. respectively from the optic or z axis 86 and 88. The CLBO crystals 20 and 24 are oriented at 45° C. from the x-axis in order to maximize the harmonic conversion efficiency for Type I phase matching.

The beams emerge from the type I phase matching of the 4th harmonic CLBO crystal 20 with the 532 nm component vertically polarized (indicated at 90), and the 266 nm and 1064 nm components horizontally polarized (indicated at 92 and 94 respectively), while the 213 nm component of the beam emerges from the type I phase matching of the 5th harmonic CLBO crystal 24 vertically polarized (indicated at 96).

Type II phase matching at this stage would leave the 1064 nm beam elliptically polarized and the 532 nm beam vertically polarized. Only a portion of an elliptically polarized 1064 nm beam will contribute to the production of the 213 nm beam and, therefore, an optical element would preferably be inserted before the fourth harmonic crystal, in order to change the polarization of the 1064 nm beam.

Figure 6:
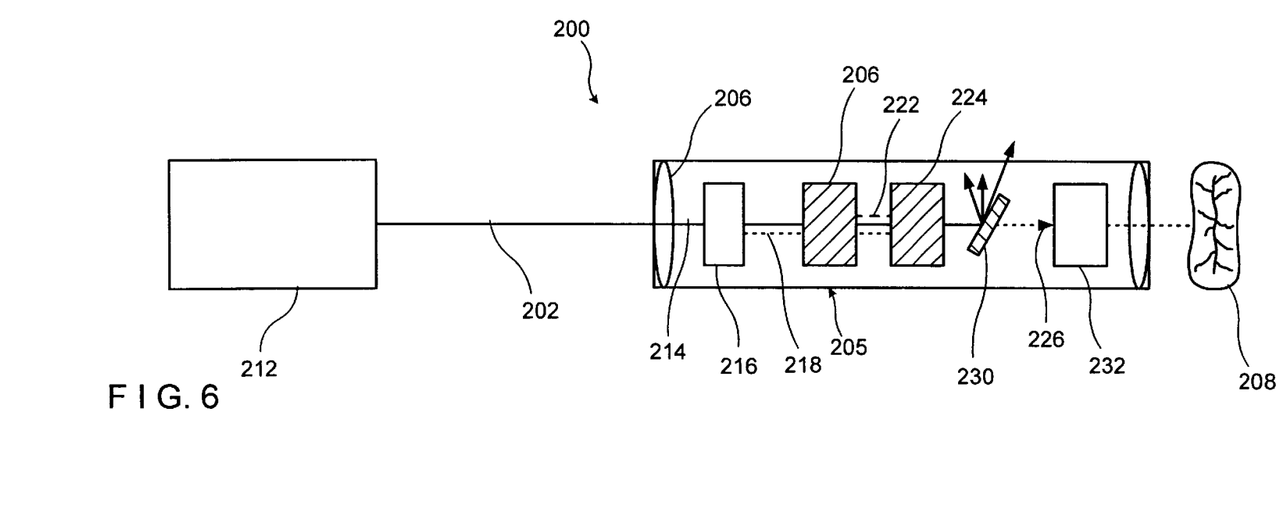
FIG. 6 is a schematic view of a laser ablation apparatus according to a third embodiment of the present invention, with a tooth under examination.

FIG. 6 shows a laser ablation apparatus 200 according to a third embodiment of the present invention, in which Nd:YAG laser 212 is connected to a fibre optic cable 202. In FIG. 6, reference numerals preceded by "2" are used to indicate corresponding elements relative to the first embodiment of FIGS. 1 to 3. When the laser 212 is stimulated, the beam 214 of fundamental wavelength travels through the fibre optic cable 202 and enters a small handpiece or probe 205 through a set of optical elements 206 provided in the handpiece 205. It should be noted that, from the perspective of the handpiece 205, either the Nd:YAG laser 212 or the fibre optic cable 205 may be regarded as the laser source. Three frequency converting crystals 216, 220, 224 are also contained within the housing of the handpiece or probe 205. Alternatively, the first, or the first and second, NLO crystals 216 and 220 may be situated in the optical path before the fibre optic cable 202. As the beam 214 of fundamental wavelength travels into the hand piece 205, it encounters the doubling NLO crystal, BBO crystal 216. Other NLO crystals may be used. The beams 214 and 218 of fundamental and second harmonic wavelength respectively pass through another NLO crystal, CLBO crystal 220. Suitable substitutes for the CLBO crystal include BBO, KD*P or any of KD*P's related isomorphs. The beam 226 of fifth harmonic wavelength is generated by CLBO crystal 224. The combined output beam (combined within CLBO crystal 224, which thereby acts as a mixing means) is delivered to the beam separating means, dichroic mirror 230, which reflects beams of fundamental, second harmonic and fourth harmonic wavelength 214, 218 and 222 respectively and transmits beam 226 of fifth harmonic wavelength.

Alternatively mirror 230 may reflect only one or two of the beams so that a combination of the beams may be applied to the tissue. The fifth harmonic is separated, and delivered by the delivery system 232 to the exterior of the apparatus 200 and directed onto the tissue to be ablated, for example tooth 208. Alternatively the tissue to be ablated could be (for example) bone.

An alternative configuration of the present apparatus would be to use any combination of NLO crystal and any laser source with the handpiece or probe described herein. Another alternative arrangement would be to replace the Nd:YAG laser with any other near infra-red source.

The various embodiments of the method and apparatus of the present invention provide a stable and viable solid state alternative to the excimer Argon-Fluoride laser for medical purposes. Producing a solid state laser at a wavelength of approximately 213 nm yields a potential substitute for the present state of the art, with the added advantages of lower cost, lower maintenance, easier use, smaller size and the absence of hazardous materials.

Modification within the spirit and scope of the invention may be readily effected by a person skilled in the art. Thus, it is to be understood that this invention is not limited to the particular embodiments described by way of example hereinabove.

What is claimed is:

1. Apparatus for generating a laser beam of wavelength suitable for ablating material, including:
   a source of an initial pulsed laser beam of wavelength unsuitable for said ablation; and
   frequency conversion means to derive from the initial laser beam by harmonic generation a laser beam of a wavelength suitable for ablating material;
   wherein said initial laser beam is pulsed at a pulse rate between 5 and 30 Hz.

2. Apparatus according to claim 1, wherein said frequency conversion means includes a non-linear optical material and means is provided to maintain said material at a temperature of at least 40° C.

3. Apparatus according to claim 2 wherein said temperature is between 40° C. and 200° C.

4. Apparatus according to claim 2 wherein said temperature is about 80° C.

5. Apparatus according to claim 2 wherein said non-linear optical material includes at least one non-linear optical crystal.

6. Apparatus according to claim 5 wherein said crystal is caesium lithium borate (CLBO).

7. Apparatus according to claim 5 wherein said frequency conversion means includes a pair of said crystals arranged in optical or non-optical contact in the path of the laser beam through the crystals.

8. Apparatus according to claim 5, wherein said apparatus includes a sealable housing for sealing said crystal(s) in a sealed dry, inert atmosphere.

9. Apparatus according to claim 1 wherein said frequency conversion means further includes optical means to separate said laser beam of a suitable wavelength from other wavelengths derived from said initial laser beam, and/or from said initial baser beam.

10. Apparatus according to claim 9 wherein said source is a solid state laser.

11. Apparatus according to claim 1 wherein said initial laser beam is in the infra-red wavelength region of the electromagnetic spectrum, and said suitable wavelength is in the ultra-violet wavelength region of the electromagnetic spectrum.

12. Apparatus according to claim 1 further including a laser delivery system for delivering said laser beam of a suitable wavelength to said material, for ablating the material.

13. Apparatus according to claim 1 wherein said apparatus is for refractive surgery of the cornea, for example by PRK or LASIK.

14. Apparatus according to claim 1, wherein the energy per pulse of said laser beam of a suitable wavelength is in the range 3 to 50 mJ.

15. Apparatus for generating a laser beam of wavelength suitable for ablating material, including:
   a source of an initial pulsed laser beam of wavelength unsuitable for said ablation; and
   frequency conversion means to derive from the initial laser beam by harmonic generation a laser beam of a wavelength suitable of ablating material;
   wherein said frequency conversion means includes a non-linear optical material and means is provided to maintain said material at a temperature of at least 40° C.

16. Apparatus according to claim 15 wherein said temperature is between 40° C. and 200° C.

17. Apparatus according to claim 16 wherein said temperature is about 80° C.

18. Apparatus according to claim 15 wherein said non-linear optical material includes at least one non-linear optical crystal.

19. Apparatus according to claim 18 wherein said crystal is caesium lithium borate (CLBO).

20. Apparatus according to claim 18 wherein said frequency conversion means includes a pair of said crystals arranged in optical or non-optical contact in the path of the laser beam through the crystals.

21. Apparatus according to claim 18, wherein said apparatus includes a sealable housing for sealing said crystal(s) in a sealed dry, inert atmosphere.

22. Apparatus according to claim 15 wherein said source is a solid state laser.

23. Apparatus according to claim 15 wherein said initial laser beam is in the infra-red wavelength region of the electromagnetic spectrum, and said suitable wavelength is in the ultra-violet wavelength region of the electromagnetic spectrum.

24. Apparatus according to claim 15 further including a laser delivery system for delivering said laser beam of a suitable wavelength to said material, for ablating the material.

25. Apparatus according to claim 15, wherein said apparatus is for refractive surgery of the cornea, for example by PRK or LASIK.

26. Apparatus according to claim 15, wherein the energy per pulse of said laser beam of a suitable wavelength is in the range 3 to 50 mJ.

27. A method of generating a laser beam of wavelength suitable for ablating material including:
   providing an initial laser beam pulsed at a pulse rate between 5 and 30 Hz and of wavelength unsuitable for said ablation; and directing the initial laser beam through frequency conversion means that derives from the initial laser beam by harmonic generation a laser beam of a wavelength suitable for ablating material.

28. A method according to claim 27 wherein said frequency conversion means includes a non-linear optical material and the method further includes maintaining said material at a temperature of at least 40° C.

29. A method according to claim 28 wherein said temperature is between 40° C. and 200° C.

30. A method according to claim 28 wherein said temperature is about 80° C.

31. A method according to claim 28, wherein said non-linear optical material includes at least one non-linear optical crystal.

32. A method according to claim 31 wherein said crystal is caesium lithium borate (CLBO).

33. A method according to claim 31 further including providing said crystal(s) in a sealed housing in a dry, inert atmosphere.

34. A method according to claim 27 wherein said source is a solid-state laser.

35. A method according to claim 27 wherein said initial laser beam is in the infra-red region of the electromagnetic spectrum, and said suitable wavelength is in the ultra-violet wavelength region of the electromagnetic spectrum.

36. A method of ablating material, including generating a laser beam according to claim 27, delivering said laser beam of a suitable wavelength to said material as a laser treatment beam, and ablating the material with the laser treatment beam.

37. A method according to claim 27 wherein the energy per pulse of said laser beam of a suitable wavelength is in the range 3 to 50 mJ.

38. A method of generating a laser beam of wavelength suitable for ablating material including:
   providing an initial pulsed laser beam of a wavelength unsuitable for said ablation; and
   directing the initial laser beam through frequency conversion means that derives from the initial laser beam by harmonic generation a laser beam of a wavelength suitable for ablating material;
   wherein said frequency conversion means includes a non-linear optical material and the method further includes maintaining said material at a temperature of at least 40° C.

39. A method according to claim 38 wherein said temperature is between 40° C. and 200° C.

40. A method according to claim 38 wherein said temperature is about 80° C.

41. A method according to claim 38 wherein said non-linear optical material includes at least one non-linear optical crystal.

42. A method according to claim 41 wherein said crystal is caesium lithium borate (CLBO).

43. A method according to claim 41 further including providing said crystal(s) in a sealed housing in a dry, inert atmosphere.

44. A method according to claim 38 wherein said source is a solid-state laser.

45. A method according to claim 38 wherein said initial laser beam is in the infra-red region of the electromagnetic spectrum, and said suitable wavelength is in the ultra-violet wavelength region of the electromagnetic spectrum.

46. A method of ablating material, including generating a laser beam according to claim 38, delivering said laser beam of a suitable wavelength to said material as a laser treatment beam, and ablating the material with the laser treatment beam.

47. A method according to claim 38 wherein the energy per pulse of said laser beam of a suitable wavelength is in the range 3 to 50 mJ.

48. A method for ablating material including:
   directing a laser beam through a frequency doubling compound;
   then directing said beam through plurality of frequency converting compounds;
   then directing said beam through a beam separating system; and
   directing said beam or a portion of said beam onto an area of said material to ablate said material,
   wherein said frequency converting compounds include at least on Caesium Lithium Borate ($CsLiB_6O_{10}$ or CLBO) crystal.

49. A method as claimed in claim 48, wherein said at least one CLBO crystal is maintained at a temperature of between 40° C. and 200° C.

50. A method as claimed in claim 48 wherein said method includes pulsing said beam with a pulse rate in the range 5 to 30 Hz and an energy pulse in the range 3 to 50 mJ.

51. An apparatus for laser ablation of material including:
   a laser source for providing a laser beam of infra-red light;
   first frequency doubling means for doubling the frequency of said infra-red beam;
   beam conversion means for converting said infra-red beam into an ultra-violet beam including:
      a second frequency doubling means for redoubling said frequency to produce a twice doubled frequency beam and
   a fifth harmonic frequency mixing means for mixing said twice frequency doubled beam with said infra-red beam to produce an ultra-violet fifth harmonic of said infra-red beam;
   a beam separating system for separating said ultra-violet harmonic; and
   a laser delivery system for delivering said ultra-violet harmonic to said material,
   wherein said apparatus is arranged to direct said infra-red beam through said first frequency doubling means and said beam conversion means, and to direct light from said beam conversion means to said beam separating system and then to said laser delivery system, and said fifth harmonic frequency mixing means or said second frequency doubling means includes a Caesium Lithium Borate ($CsLiB_6O_{10}$ or CLBO) crystal.

52. An apparatus as claimed in claim 51 wherein said apparatus includes a heating means for maintaining said CLBO crystal at one or more temperatures between 40° C. and 200° C.

53. An apparatus as claimed in claim 51 including beam pulsing means for pulsing said beam with a pulse rate in the range 5 to 30 Hz and an energy per pulse in the range 3 to 50 mJ.

54. An apparatus as claimed in claim 51 wherein said apparatus constitutes a laser ablation handpiece or probe.

55. Apparatus for generating a laser beam of wavelength suitable for ablating material, including:
   a source of an initial laser beam pulsed at a predetermined pulse rate and of wavelength unsuitable for said ablation;
   frequency conversion means to derive from the initial laser beam a harmonic component of said wavelength suitable for ablating material;
   wherein said frequency conversion means includes a non-linear optical material and means is provided to maintain said non-linear material at a predetermined elevated temperature, and wherein said pulse rate is predetermined whereby the acceptance angle of the harmonic component remains substantially within predetermined limits for successive pulses of the initial laser beam at said elevated temperature.

56. Apparatus according to claim 55 wherein said non-linear optical material is held in a heat conductive holder to which, in use, heat is applied for maintaining the material at said predetermined elevated temperature.

57. Apparatus according to claim 55 wherein said non-linear optical material is a crystal.

58. Apparatus according to claim 55 wherein said non-linear optical material comprises a pair of juxtaposed crystals for effecting successive frequency conversion operations as the laser beam traverses the crystals in turn.

59. Apparatus according to claim 58 wherein said pair of crystals are retained together in contact in a heat conductive holder to which, in use, heat is applied for maintaining the material at said predetermined elevated temperature, means being included to bias the crystals against each other, for minimising energy losses.

60. Apparatus according to claim 55 wherein said non-linear optical material includes at least one caesium lithium borate ($CsLiB_6O_{10}$ or CLBO) crystal.

61. Apparatus according to claim 55 wherein said laser beam has a fundamental wavelength of between 0.5 and 2.5 micron.

62. Apparatus according to claim 55 further comprising beam separating means for separating said laser beam of suitable wavelength from other harmonics generated by the frequency conversion means.

63. A method of generating a laser beam of wavelength suitable for ablating material, including:

providing an initial laser beam pulsed at a predetermined pulse rate and of wavelength unsuitable for said ablation, directing the initial laser beam through frequency conversion means including a non-linear optical material that derives from the initial laser beam a harmonic component of said wavelength suitable for ablating material;

maintaining said non-linear optical material at a predetermined elevated temperature in a predetermined range; and setting said pulse rate whereby the acceptance angle of the harmonic component remains substantially within predetermined limits for successive pulses of the initial laser beam at said elevated temperature.

64. A method according to claim 63 wherein said non-linear optical material is a crystal.

65. A method according to claim 63 wherein said non-linear optical material comprises a pair of juxtaposed crystals for effecting successive frequency conversion operations as the laser beam traverses the crystals in turn.

66. A method according to claim 65 wherein said pair of crystals are retained together in contact.

67. A method according to claim 63 wherein said non-linear optical material includes at least one caesium lithium borate ($CsLiB_6O_{10}$ or CLBO) crystal.

68. A method according to claim 63 wherein said laser beam has a fundamental wavelength: of between 0.5 and 2.5 micron.

69. A method according to claim 63 further including utilising the laser beam of suitable wavelength to ablate human or animal tissue, eg corneal tissue.

70. A method according to claim 69 wherein the tissue is corneal and the UV energy deposited on the material is between 3 and 50 mJ per pulse.

* * * * *